R. D. LOUDON.
Hog-Trap.
No. 212,807. Patented Mar. 4, 1879.
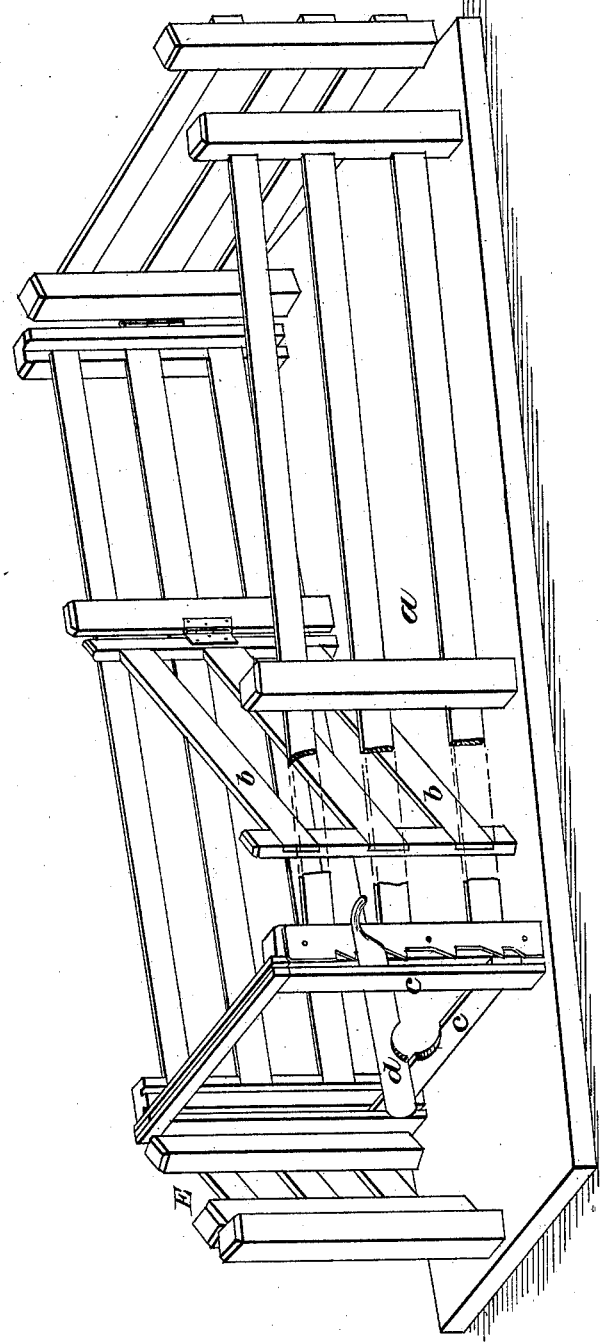
Witnesses:
Inventor:
Rodney D. Louden.

UNITED STATES PATENT OFFICE.

RODNEY D. LOUDON, OF WILMINGTON, ILLINOIS.

IMPROVEMENT IN HOG-TRAPS.

Specification forming part of Letters Patent No. 212,807, dated March 4, 1879; application filed July 11, 1878.

*To all whom it may concern:*

Be it known that I, RODNEY D. LOUDON, of Wilmington, in the county of Will and State of Illinois, have invented a new and useful combination and arrangement for catching and holding hogs for the purpose of ringing or castrating, or for assorting and separating into different lots, to be called "The Hog-Catcher," of which the following is a specification:

The nature of my invention consists in a convenient chute, $a$, opening from a yard in which the hogs are inclosed. This chute ends in a narrow passage, made adjustable by the gate $b$ to the size of the hogs you are handling, and concludes with a trap, which consists of a stationary bed-piece and left side piece, $c\ c$, and a lever, $d$, which the operator closes upon the hog's neck as he is driven through. This lever, when closed upon the hog, is held in place by a ratchet, so that both hands of the operator are free to use the wringer or knife.

For assorting, throw the lever back and swing the gate E from one side to the other, as you wish the hogs to pass into one or other of the yards in the rear.

What I claim as my invention is—

The adjustable chute and lever-trap combined with the double passage and gate in rear of trap, for separating the hogs as they pass.

RODNEY D. LOUDON.

Witnesses:
    ROBERT TOLLINGTON,
    GEO. I. TINSLAR.